United States Patent
Chretien et al.

(10) Patent No.: US 10,840,830 B2
(45) Date of Patent: Nov. 17, 2020

(54) DRIVE CIRCUIT FOR ELECTRIC MOTORS

(71) Applicant: Regal Beloit America, Inc., Beloit, WI (US)

(72) Inventors: Ludovic Andre Chretien, Columbia City, IN (US); Howard R. Richardson, Troy, OH (US); Gregory Lewis Gross, Fort Wayne, IN (US); Jevon D. Reynolds, Dayton, OH (US); Joseph Stephen Carnes, Columbia City, IN (US); Zachary Joseph Stauffer, Fort Wayne, IN (US); Justin Michael Magyar, Troy, OH (US); Kenneth L. Osborne, St. Louis, MO (US); Nathan E. Snell, Tipp City, OH (US)

(73) Assignee: Regal Beloit America, Inc, Beloit, WI (US)

( * ) Notice: Subject to any disclaimer, the term of this patent is extended or adjusted under 35 U.S.C. 154(b) by 0 days.

(21) Appl. No.: 16/500,741

(22) PCT Filed: Apr. 3, 2018

(86) PCT No.: PCT/US2018/025916
§ 371 (c)(1),
(2) Date: Oct. 3, 2019

(87) PCT Pub. No.: WO2018/187346
PCT Pub. Date: Oct. 11, 2018

(65) Prior Publication Data
US 2020/0044583 A1 Feb. 6, 2020

Related U.S. Application Data

(60) Provisional application No. 62/481,494, filed on Apr. 4, 2017.

(51) Int. Cl.
*H02P 1/44* (2006.01)
*F04D 13/06* (2006.01)

(52) U.S. Cl.
CPC ............... *H02P 1/44* (2013.01); *F04D 13/06* (2013.01)

(58) Field of Classification Search
None
See application file for complete search history.

(56) References Cited

U.S. PATENT DOCUMENTS

| | | | | |
|---|---|---|---|---|
| 4,308,491 A | * | 12/1981 | Joyner, Jr. | H02H 7/0833 318/732 |
| 5,234,319 A | * | 8/1993 | Wilder | F04B 49/025 417/40 |
| 5,668,457 A | * | 9/1997 | Motamed | F04B 49/065 318/606 |
| 9,998,054 B1 | * | 6/2018 | Yohanan | H02P 27/047 |
| 2003/0043606 A1 | | 3/2003 | Lipo et al. | |

(Continued)

OTHER PUBLICATIONS

International Search Report and Written Opinion, dated Jun. 21, 2018, for International application No. PCT/US2018/025916.

*Primary Examiner* — Bentsu Ro
(74) *Attorney, Agent, or Firm* — Armstrong Teasdale LLP

(57) ABSTRACT

A drive circuit for an electric pump motor is provided. The drive circuit includes an inverter and a contactor. The inverter is configured to supply variable frequency current to the electric motor. The contactor is configured to supply the line frequency current to the electric motor.

15 Claims, 2 Drawing Sheets

(56) References Cited

U.S. PATENT DOCUMENTS

| | | |
|---|---|---|
| 2013/0154774 A1 | 6/2013 | Bhavaraju et al. |
| 2014/0356686 A1 | 12/2014 | Namou et al. |
| 2015/0292501 A1* | 10/2015 | Knight .................... F04B 17/03 |
| | | 324/511 |
| 2016/0197566 A1 | 7/2016 | Alvey et al. |
| 2019/0376511 A1* | 12/2019 | Kobayashi ............ F04C 29/047 |

* cited by examiner

DRIVE CIRCUIT FOR ELECTRIC MOTORS

CROSS-REFERENCE TO RELATED APPLICATION

This application claims the benefit of priority of U.S. Provisional Patent Application No. 62/481,494, titled "Drive Circuit for Electric Motors," filed 4 Apr. 2017, the contents of which are hereby incorporated herein by reference in their entirety.

BACKGROUND

The field of the disclosure relates generally to a drive circuit for an electric motor, and, more specifically, a drive circuit for electric motors in pumping, agricultural, and ventilation applications.

There are many known applications for electric motors, including uses in fluid pumping, such as, for example, pool and spa, hot water circulators, carbonator systems, and sump systems, and in agriculture, such as, for example, fans, blowers, feed lot conveyors, liquid manure spreaders, unloaders, compressors, and storage bin conveyors. In such applications, many utilize single-phase or three-phase induction motors, such as, for example permanent-split capacitor (PSC) motors and electronically commutated (ECM) motors.

At least some known induction motors are fixed speed motors that operate most efficiently at line frequency power. Further, at low load conditions, single speed motors operate less efficiently. Alternatively, an induction motor may be driven with a variable speed motor controller to adapt motor speed to a load level. Such configurations are generally limited by power factor, electromagnetic interference, and electrical losses.

A drive circuit for induction motors enables efficient operation at both high and low load conditions. For example, a PSC motor operating a compressor in a heating, ventilation and air conditioning (HVAC) system may experience high load conditions during peak temperatures and low load conditions during milder temperatures. The drive circuit operates the PSC motor using an inverter under low load conditions, and operates the PSC motor using line frequency power under high load conditions.

BRIEF DESCRIPTION

In one aspect, a drive circuit for an electric pump motor is provided. The drive circuit includes an inverter and a contactor. The inverter is configured to supply variable frequency current to the electric motor. The contactor is configured to supply the line frequency current to the electric motor.

In another aspect, an electric pump motor is provided. The electric pump motor includes a plurality of windings and a drive circuit. The drive circuit is coupled to the plurality of windings. The drive circuit includes an inverter and a contactor. The inverter is configured to supply variable frequency current to the plurality of windings when the inverter is enabled. The contactor is configured to supply the line frequency current to the plurality of windings after the inverter is disabled.

DETAILED DESCRIPTION

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

Figure 1:
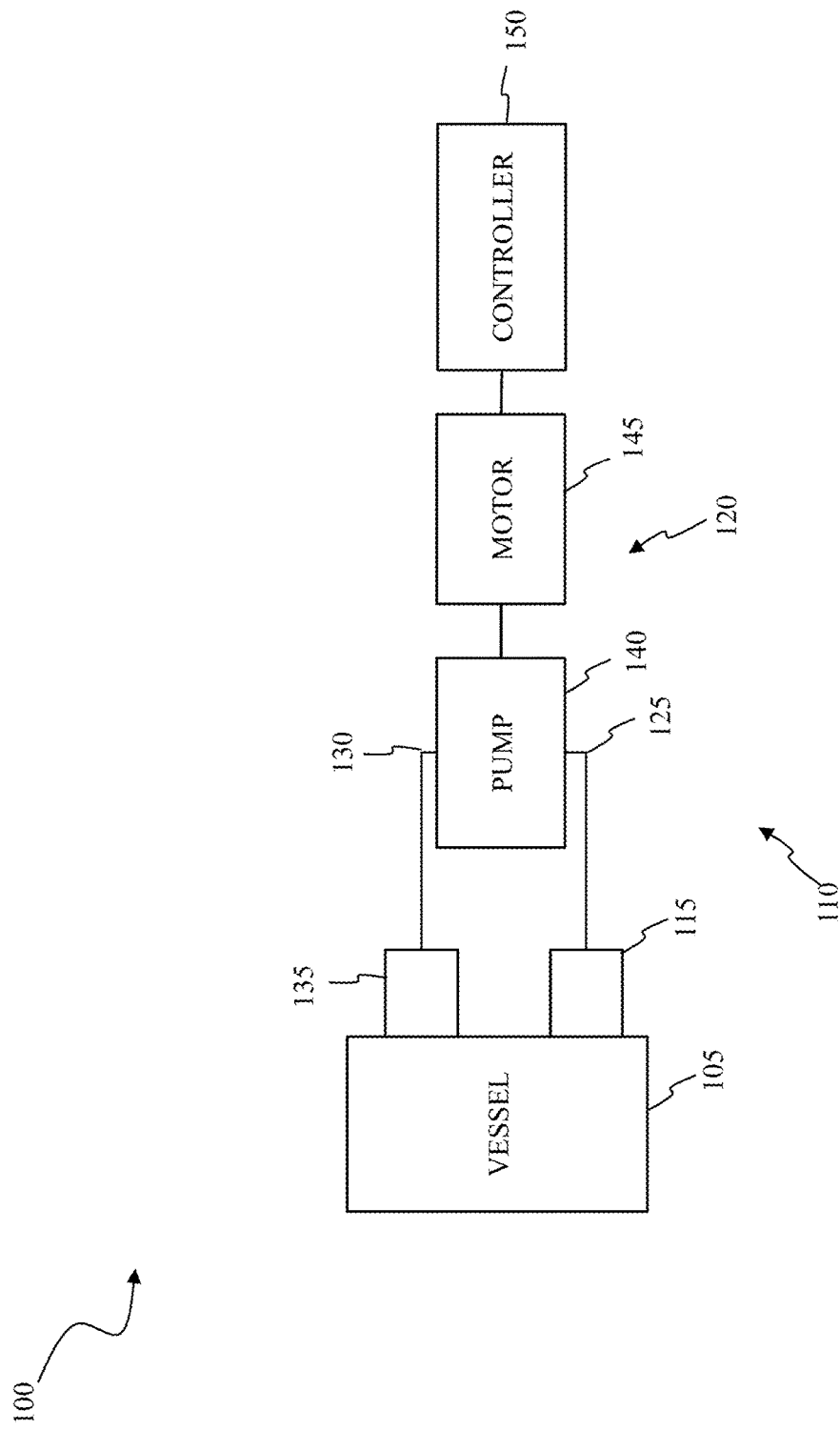
FIG. 1 is a schematic diagram of an exemplary jetted spa system in which an electric pump motor is embodied.

FIG. 1 is a block diagram of a jetted-spa 100. However, the systems described herein are not limited to jetted-spa 100 and can be used in other jetted-fluid systems (e.g., pools, whirlpools, jetted-tubs, etc.). It is also envisioned that the invention can be used in other applications (e.g., fluid-pumping applications).

As shown in FIG. 1, the spa 100 includes a vessel 105. As used herein, the vessel 105 is a hollow container such as a tub, pool, tank, or vat that holds a load. The load includes a fluid, such as chlorinated water, and may include one or more occupants or items. The spa further includes a fluid-movement system 110 coupled to the vessel 105. The fluid-movement system 110 includes a drain 115, a pumping apparatus 120 having an inlet 125 coupled to the drain and an outlet 130, and a return 135 coupled to the outlet 130 of the pumping apparatus 120. The pumping apparatus 120 includes a pump 140, a motor 145 coupled to the pump 140, and a controller 150 for controlling the motor 145. For the constructions described herein, the pump 140 is a centrifugal pump and the motor 145 is an induction motor (e.g., capacitor-start, capacitor-run induction motor; split-phase induction motor; three-phase induction motor; etc.). However, the systems described herein are not limited to this type of pump or motor. For example, a brushless, direct current (DC) motor may be used in a different pumping application. For other constructions, a jetted-fluid system can include multiple drains, multiple returns, or even multiple fluid movement systems.

Referring back to FIG. 1, the vessel 105 holds a fluid. When the fluid movement system 110 is active, the pump 140 causes the fluid to move from the drain 115, through the pump 140, and jet into the vessel 105. This pumping operation occurs when the controller 150 controllably provides a power to the motor 145, resulting in a mechanical movement by the motor 145. The coupling of the motor 145 (e.g., a direct coupling or an indirect coupling via a linkage system) to the pump 140 results in the motor 145 mechanically operating the pump 140 to move the fluid. The operation of the controller 150 can be via an operator interface, which may be as simple as an ON switch.

Figure 2:
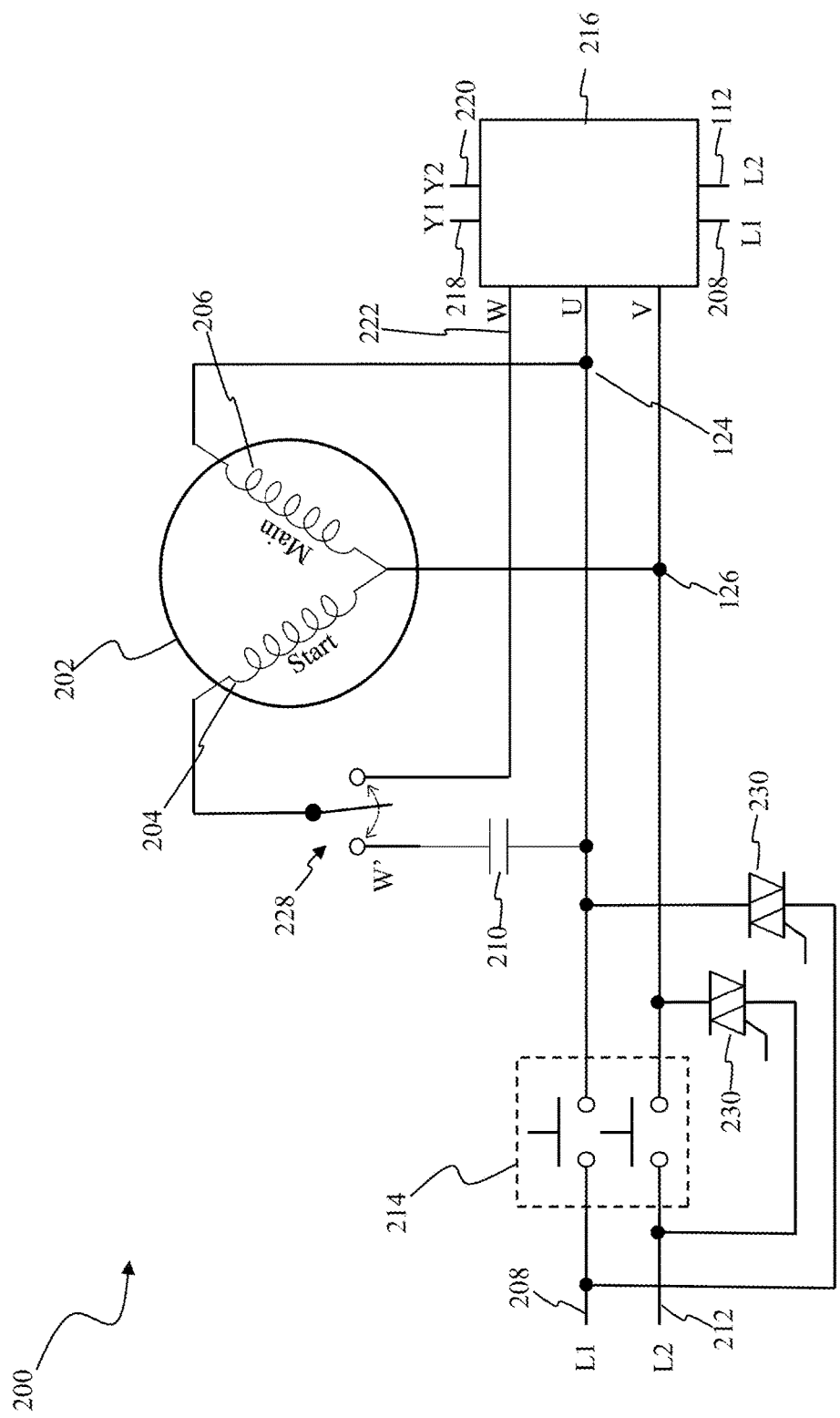
FIG. 2 is a schematic diagram of an exemplary drive circuit for an electric pump motor.

FIG. 2 is a schematic diagram of an exemplary drive circuit 200 for an electric pump motor 202. Electric pump motor 202 includes a start winding 204 and a main winding 206. During normal line frequency operation, line frequency current, such as 50 Hertz or 60 Hertz, for example, is supplied on a first line, or L1, 208 to start winding 204 through a capacitor 210, and to main winding 206. A second line, or L2, 212 provides a return, or neutral, for the line frequency current. Drive circuit 200 includes a contactor 214 for connecting and disconnecting L1 and L2 to electric pump motor 202. Contactor 214 is a two pole mechanical contactor that is commutated by energizing a coil (not shown). In certain embodiments, capacitor 210 may be coupled to L1 on either side of contactor 214.

Drive circuit 200 includes an inverter 216 that is enabled to drive electric pump motor 202 with variable frequency power under low load, or at least less than full load, conditions. Inverter 216 is supplied line frequency power on L1 and L2, and is controlled over control lines 218 and 220, or Y1 and Y2. In alternative embodiments, inverter 216 may be controlled by any other suitable means, including, for example, digital control signals and analog control signals. Inverter 216 enables variable speed operation of electric pump motor 202 by regulating phase and frequency of alternating current (AC) voltages on output terminals W, U, and V. Terminal W is coupled to a node 222, terminal U is coupled to a node 224, and terminal V is coupled to a node 226. Drive circuit 200 includes a bypass switch 228 that enables bypass of capacitor 210 during operation through inverter 216. When driven by inverter 216, main winding 206 of electric pump motor 202 is coupled across nodes 222 and 226, i.e., terminals W and V of inverter 216, and start winding 204 is coupled across nodes 224 and 226, i.e., terminals U and V of inverter 216.

When operating electric pump motor 202 using inverter 216, contactor 214 is open and inverter 216 is enabled via control lines 218 and 220, or other suitable control means. To transition to line frequency power, inverter 216 is disabled and contactor 214 is closed to couple L1 and L2 directly to electric pump motor 202. Contactor 214 may require one to two line cycles to close. Drive circuit 200 includes solid state switches 230 coupled in parallel with the two poles of contactor 214 on L1 and L2. During the transition from inverter 216 to line frequency power, and after inverter 216 is disabled, solid state switches 230 are closed to couple L1 and L2 directly to electric pump motor 202 in as few as 1 ms, thereby avoiding a potential locked rotor due to loading on and stalling of electric pump motor 202. Solid state switches 230 remain closed and conduct line frequency current until contactor 214 is closed. Once contactor 214 is closed, solid state switches 230 are opened to redirect the line frequency current through contactor 214.

In one embodiment, the electric pump motor operates on line frequency power for high speed operation and utilizes a low-power drive, or inverter, to enable a variable speed range, for example, from 1600 RPM to 2400 RPM. In alternative embodiments, the variable speed range may be defined for a particular application.

In one embodiment, the electric pump motor operates at two fixed speeds utilizing the above-described architecture. For example, the electric pump motor operates at 2750 RPM and 2250 RPM. In alternative embodiments, the two fixed speeds may be defined for a particular application. In further alternative embodiments, the electric pump motor operates at three or more fixed speeds utilizing. For example, the electric pump motor may operate at a high speed using line-frequency power, and at a medium and a low speed using a low-power drive, or an inverter.

In one embodiment, the electric pump motor is operable at a single fixed speed, e.g., 2750 RPM, using the above-described architecture. For example, in such an embodiment, the electric pump motor operates at the fixed speed using line-frequency power when the pumping load is high, and using an inverter when the pumping load is low. In alternative embodiments, the single fixed speed may be defined for a particular application.

The methods and systems described herein may be implemented using computer programming or engineering techniques including computer software, firmware, hardware or any combination or subset thereof, wherein the technical effect may include at least one of: (a) improving power factor; (b) reducing EMI; (c) increasing efficiency; (d) enabling variable speed operation of a fixed speed electric motor; and (e) enabling control of the starting acceleration of a fixed speed electric motor.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the terms processor, processing device, and controller.

In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are examples only, and are thus not limiting as to the types of memory usable for storage of a computer program.

The systems and methods described herein are not limited to the specific embodiments described herein, but rather, components of the systems and/or steps of the methods may be utilized independently and separately from other components and/or steps described herein.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electric pump system, comprising:
 a pump configured to be disposed in fluid communication with a volume of fluid, said pump and the volume of fluid together defining a load;
 an electric motor comprising a rotor and a stator, said rotor coupled to said pump; and
 a drive circuit coupled to said stator, said drive circuit comprising:
  an inverter configured to supply an alternating current (AC) power to said stator when the load is a full load; and
  a contactor configured to supply a line frequency power from an AC source to said stator when the load is a low load that is less than the full load.

2. The electric pump system of claim 1, wherein said drive circuit further comprises a rectifier stage configured to convert the line frequency power to a direct current (DC) power that is supplied to said inverter.

3. The electric pump system of claim 1, wherein said stator comprises a main winding coupled across a first phase output and a second phase output of said inverter, and a start winding coupled across a the second phase output and a third phase output of said inverter when operating said electric motor using said inverter.

4. The electric pump system of claim 3, wherein said stator comprises said main winding coupled to a first phase output of said contactor, and said start winding coupled to the first phase output of said contactor through a capacitor.

5. The electric pump system of claim 4 further comprising a switch device configured to couple and decouple the capacitor from said start winding.

6. The electric pump system of claim 1 further comprising a system controller configured to control operation of said contactor.

7. The electric pump system of claim 1 further comprising a semiconductor switch coupled in parallel with said contactor and between the AC source and said stator, said semiconductor switch configured to couple said stator to the line frequency power when transitioning from operating said electric motor with said inverter to operating said electric motor with line frequency power.

8. The electric pump system of claim 1, wherein the full load is characterized by a high speed and a high fluid flow rate demand.

9. The electric pump system of claim 1, wherein the low load is characterized by a variable speed and a variable fluid flow rate demand.

10. A method of operating an electric pump system to drive a pumping load, said method comprising:
 operating an inverter to supply an alternating current (AC) power to a stator of an electric motor when the pumping load on the electric motor is a low load;
 disabling the inverter; and
 closing a contactor coupled between the stator and an AC source to supply line frequency power to the stator when the pumping load is a full load.

11. The method of claim 10 further comprising rectifying the line frequency power to produce a direct current (DC) power to supply the inverter.

12. The method of claim 10, wherein operating the inverter to supply AC power to the stator comprises coupling windings of the stator across three phases of output from the inverter in line-to-line configuration.

13. The method of claim 12 further comprising coupling, by a switch, a start winding of the stator to a phase of the line frequency power through a capacitor when the inverter is disabled and the contactor is closed.

14. The method of claim 10, wherein operating the inverter further comprises generating the AC power having a variable frequency and a variable amplitude to meet a variable pumping load.

15. The method of claim 14 further comprising closing a semiconductor switch coupled in parallel with the contactor and between the AC source and the stator, wherein closing the semiconductor switch couples the stator to the line frequency power when transitioning from operating the electric motor with the inverter to operating the electric motor with line frequency power.

* * * * *